United States Patent [19]
Koda

[11] Patent Number: 6,068,811
[45] Date of Patent: May 30, 2000

[54] METHOD OF MOLDING INNER THREAD ON NECK PORTION OF PREFORM

[75] Inventor: Hideaki Koda, Nagano-ken, Japan

[73] Assignee: A.K. Technical Laboratory, Inc., Nagano-ken, Japan

[21] Appl. No.: 09/068,182

[22] PCT Filed: Sep. 5, 1997

[86] PCT No.: PCT/JP97/03117

§ 371 Date: May 4, 1998

§ 102(e) Date: May 4, 1998

[87] PCT Pub. No.: WO98/09794

PCT Pub. Date: Mar. 12, 1998

[30] Foreign Application Priority Data

Sep. 5, 1996 [JP] Japan ................................ 8-235395

[51] Int. Cl.[7] .................................................. B29C 49/06
[52] U.S. Cl. .......................... 264/537; 425/525; 425/533
[58] Field of Search .................................. 264/530, 523, 264/533, 537, 318, 335; 425/533, 525

[56] References Cited

U.S. PATENT DOCUMENTS

| | | | |
|---|---|---|---|
| 3,029,468 | 4/1962 | Valyi | 425/525 |
| 3,733,309 | 5/1973 | Wyeth et al. | 264/539 |
| 3,969,060 | 7/1976 | Rosenkranz et al. | 425/525 |
| 4,131,665 | 12/1978 | Bodson et al. | 264/572 |

FOREIGN PATENT DOCUMENTS

| | | | |
|---|---|---|---|
| 2543640 | 4/1977 | Germany | 264/530 |
| 62-156923 | 7/1987 | Japan | 264/537 |

*Primary Examiner*—Catherine Timm
*Attorney, Agent, or Firm*—Weingarten, Schurgin, Gagnebin & Hayes LLP

[57] ABSTRACT

A method for forming an inner thread of a preform is provided, in which an injection core can be removed after molding the inner thread on an inner surface of a neck portion with the base portion of the injection core by enlarging the diameter of the neck portion by blowing air. An inner wall 42$b$ with a transferred inner thread is molded by using a barrel spacer 16 inserted removably into a neck mold 6 from an injection mold 1 side and a base portion 10$a$ of the injection core 10 that has a thread pattern 12 on the outer surface and is inserted into the injection mold 1 through the neck mold 6. While the temperature of the inner wall 42$b$ is high enough for deforming, the spacer 16 is removed to form an expansion space in the neck mold. An air is blown between the injection core 10 and the inner wall 42$b$ to enlarge the inner wall 42$b$ fully in the expansion space, thereby a gap 19 for removing the core between the inner surface of the inner wall 42$b$ and the outer surface of the base portion of the injection core 10.

4 Claims, 6 Drawing Sheets

Fig. 9A
Fig. 9B
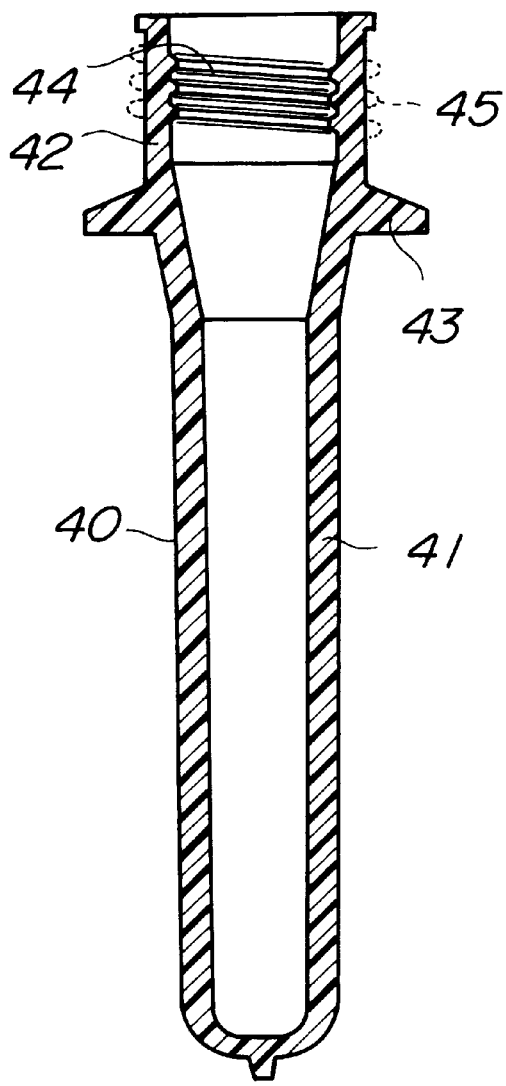
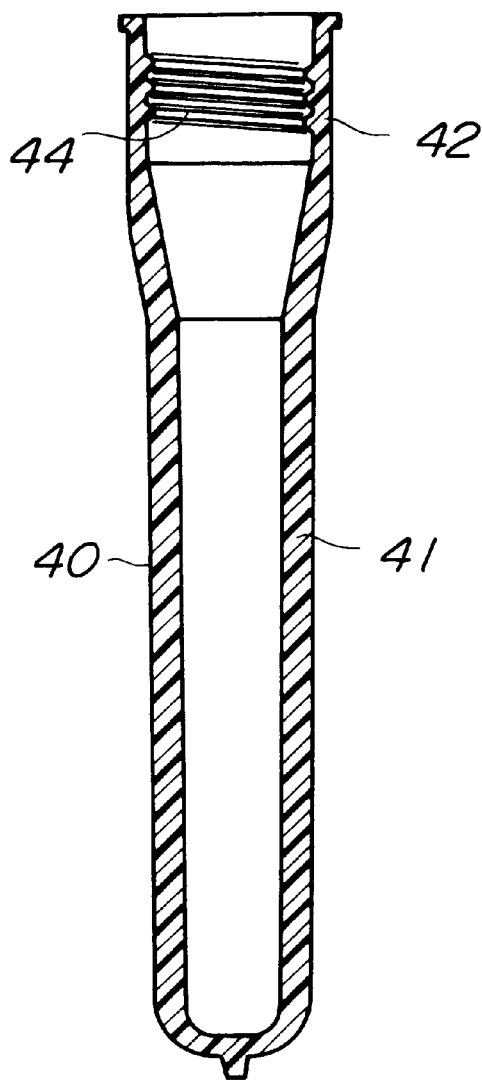

METHOD OF MOLDING INNER THREAD ON NECK PORTION OF PREFORM

FIELD OF THE INVENTION

The present invention relates to a method for forming an inner thread at the neck portion of a preform that is used for molding a packaging container such as a PET bottle having a thin body portion by stretch blow molding.

BACKGROUND ART

Most plastic bottle used for a packaging container has an outer thread at the neck portion and a cap is screwed on the thread to seal the opening portion. This outer thread can be formed by using a split mold, so there is no technical hardness in the injection molding. However, in the case of an inner thread, it is transferred from an outer thread pattern formed on the outer surface of a core mold. Therefore, the core should be pulled out rotating it after molding.

This pulling-out of the core is performed not only by rotating the core but also by moving the core in the axial direction. Therefore, the rotation and the axial moving should be synchronized. However, the synchronizing action mechanically limits the number of products per one molding. Thus, it is difficult to mold many products at one time like a preform molding because of a mechanical restriction. For this reason, even if a screw-plug is suitable for sealing the opening portion of a certain packaging container, a screw cap sealing with an outer thread is used to avoid difficulty of forming an inner thread.

The object of the present invention is to provide a novel method for forming an inner thread at the neck portion of the preform, the method enabling an injection core whose base portion forms an inner thread being pulled out after molding by enlarging the neck portion by blowing air, which has been desired in the molding of the preform for a packaging container such as a bottle having an inner thread at the neck portion thereof.

DISCLOSURE OF THE INVENTION

The present invention for achieving the above-mentioned object is a method for forming an inner thread in a preform, the method comprising the steps of forming a neck portion having a transferred inner thread using a neck mold having a mold surface of a barrel spacer inserted removably from the side of an injection mold for molding a body portion of the preform, and an injection core that is inserted into the injection mold through the neck mold, the outer surface of the base portion of the injection core being provided with a thread pattern; forming an expansion space within the neck mold by removing the spacer; and expanding the neck portion fully in the expansion space by blowing air between the injection core and the neck portion while a temperature of the neck portion is high enough for deforming, so that a gap for removing the core is formed between the inner surface of the neck portion and the outer surface of the base portion of the injection core.

Furthermore, the present invention provides another method for forming an inner thread in a preform, in which a double-wall neck portion is formed having an outer wall and an inner wall with the transferred inner thread by defining outer and inner portions of the neck cavity in the neck mold by the spacer, and while a temperature of the inner wall is high enough for deforming, the expansion space is formed between the inner wall and the outer wall by removing the spacer, and the inner wall is expanded by the blown air until the inner wall contacts the outer wall, so that the gap is formed for removing the core between the inner surface of the inner wall and the outer wall of the base portion of the injection core.

Furthermore, the present invention provides another method for forming an inner thread in a preform, in which the base portion of the injection core is tapered off toward the core end and the inner surface of the spacer facing the thread pattern of the base portion has substantially the same angle with the base portion so that neck portion or the inner wall is formed in the tapered angle with the thread formed by transferring onto the tapered inner surface, and then the neck portion or the inner wall is expanded fully in the expansion space by the blown air so as to extend vertically.

BRIEF DESCRIPTION OF THE DRAWINGS

FIG. 9A is a cross section of a preform having an inner thread at the neck portion molded in accordance with the first embodiment.

FIG. 9B is a cross section of a preform having an inner thread at the neck portion molded in accordance with the second and third embodiment.

BEST MODE FOR CARRYING OUT THE INVENTION

The present invention is described in detail hereinafter with reference to the accompanying drawings.

Figure 1:
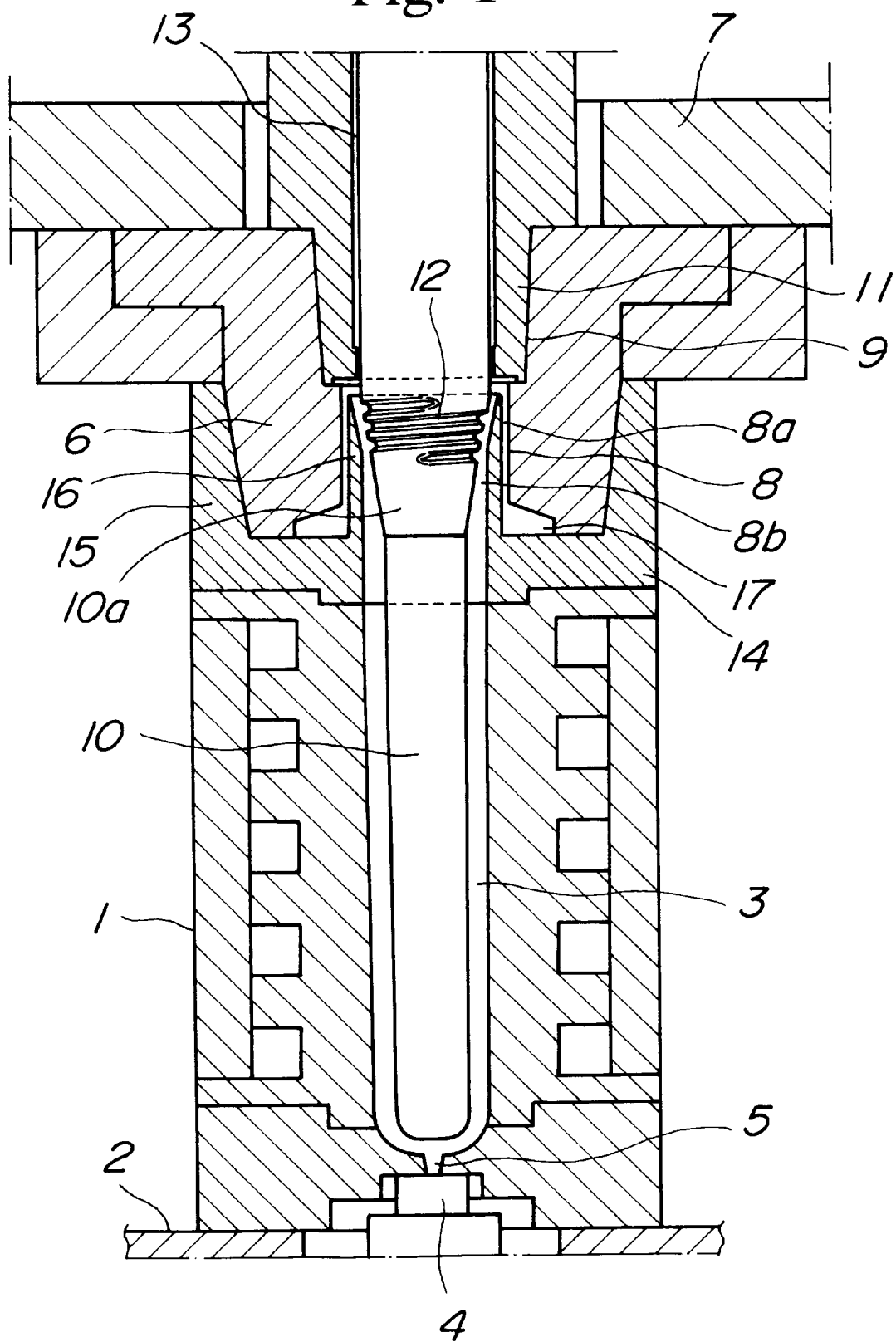
FIG. 1 is a cross section of a mold in a closed stat used for a first embodiment of the method for forming an inner thread according to the present invention.
Figure 2:
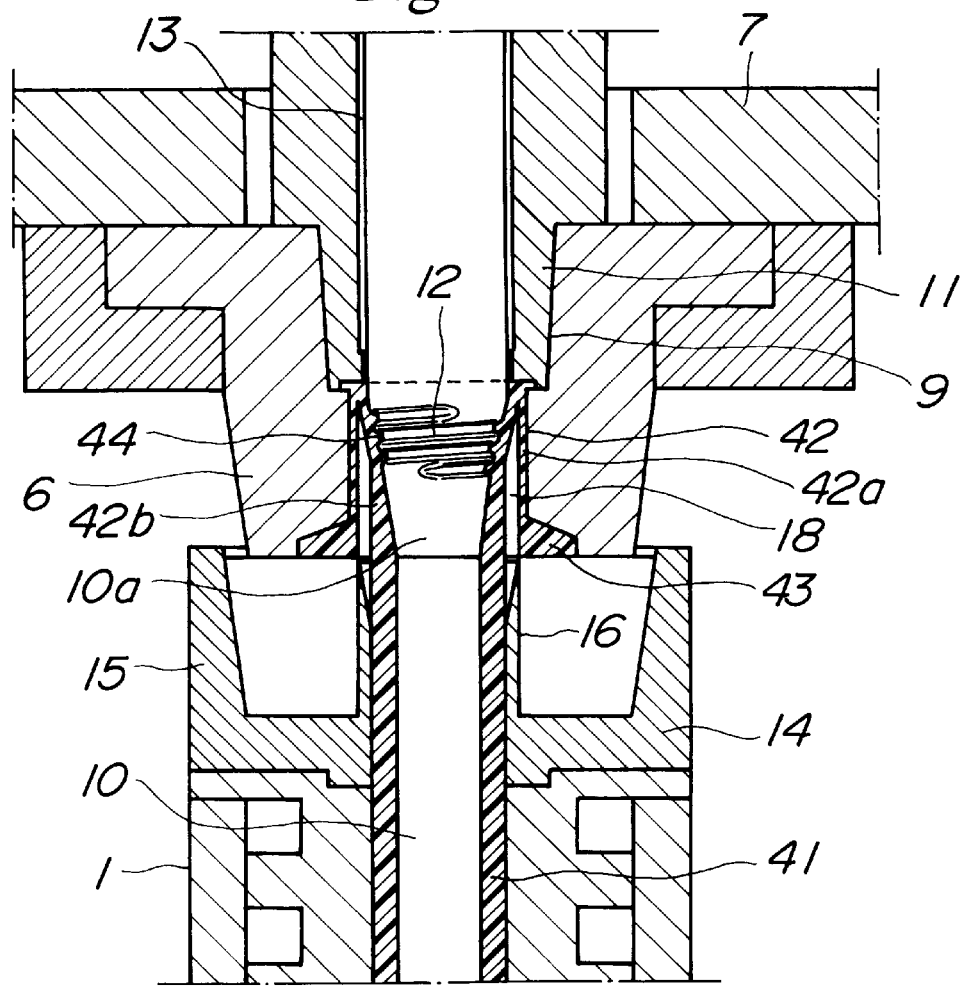
FIG. 2 is a cross section of a primary portion showing the inner thread formed at a double-wall neck portion.
Figure 3:
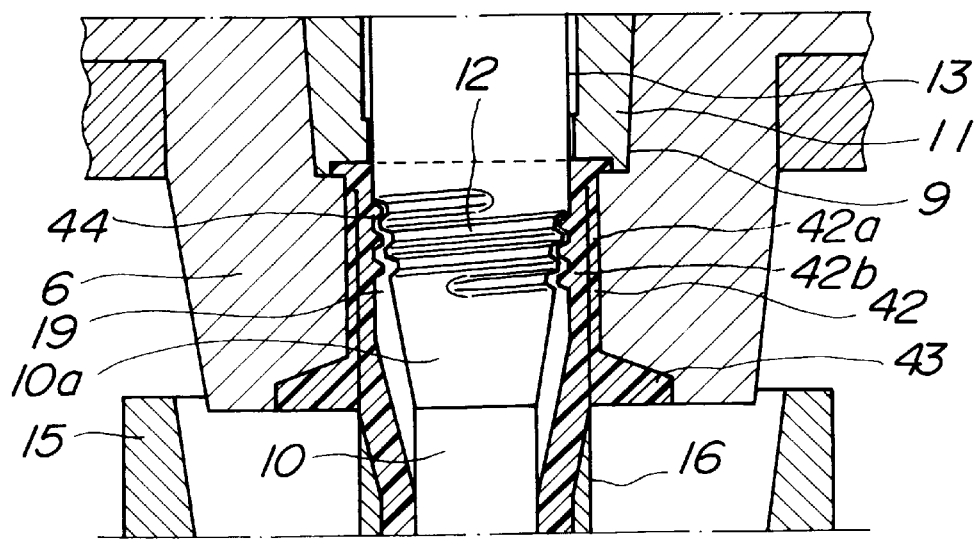
FIG. 3 is across section of a primary portion showing a gap for removing the core formed by blowing air.

[First Embodiment] (FIGS. 1~3)

In the figures, reference numeral 1 designates an injection mold fixed vertically on a base 2. The mold 1 includes a vertically elongated injection cavity 3 disposed in the middle inside of the mold for molding a body portion 41 of a preform 40 with a bottom shown in FIG. 9A. This injection cavity 3 has an opening at the upper side of the injection mold 1 and a gate 5 at the middle of the bottom that contacts a nozzle 4.

Reference numeral 6 designates a neck mold for molding a neck portion 42 of the preform 40. The neck mold 6 comprises a pair of split molds, which are attached to the lower side of a transport table 7 so as to be able to open and close horizontally. The neck mold 6 has a neck cavity 8 formed by closing the pair of split molds in the lower portion and a core insertion hole 9 for receiving the core is formed at the upper side of the neck cavity 8.

Reference numeral 10 designates an injection core for molding an inner surface of the preform 40. The injection core 10 is received in the neck mold when inserting into the core insertion hole 9 from the upper side, and penetrates the core member 11 for molding the opening end of the neck portion 42 and the neck mold 6 to be inserted in the middle of the injection cavity 3. This injection core 10 has a base portion 10a positioned in the neck mold, which is tapered off toward the core end and outer surface of which is provided with plural turns of thread pattern 12. There is an air-flowing gap 13 between the injection core 10 and the core member 11.

A tapering angle of the base portion 10a depends on the diameter of the core and is preferably 15 degree for the diameter of 20 millimeters.

Reference numeral 14 designates a neck mold receiving member disposed on the upper surface of the injection mold 1. The neck mold receiving member 14 has an engaging periphery 15 and an opening in the middle portion thereof communicating with the injection cavity 3. The upper rim of the opening is provided with a barrel spacer 16 that is received in the neck cavity 8 when the mold is closed. By this spacer 16, the neck cavity 8 is separated into the outer portion 8a and the inner portion 8b, which are coaxial and communicated with each other at the opening end.

The inner surface of the upper portion of the spacer 16, i.e., the inner surface facing the thread pattern 12 of the base portion 10a of the injection core 10 has substantially the same angle as the base portion 10a, thereby the inner surface of the preform 40 is formed in the tapered shape from the lower side of the opening end inwardly.

In the above mentioned structure, the neck mold 6 is moved downward onto the injection mold 1 as usual manner so as to close the mold, then the core member 11 is moved downward with the injection mold 1 until the lower end portion of the core member 11 fits in the core insertion hole 9, and the injection core 10 penetrates the neck mold 6 to be inserted in the injection cavity 3 as shown in FIG. 1. In this state, a molten resin such as a polyester is injected from the bottom nozzle 4 and is filled in the injection cavity 3 that is cooled at a predetermined temperature. The molten resin flows into the inner portion 8b of the neck cavity 8 from the injection cavity 3, then flows into the outer portion 8a via the opening end to fill a support ring cavity 17 communicated with the lower periphery of the outer portion 8a.

By the injection and filling of the molten resin in the neck mold, a double-wall neck portion 42 including an outer wall 42a and an inner wall 42b separated from each other by the spacer 16 (see FIG. 2) is formed.

At the same time as the neck portion 42 is molded, a support ring 43 is outwardly formed around the lower portion of the outer wall 42a, and an inner thread 42 is formed on the tapered inner surface of the inner wall 42b by transferring from the thread pattern 12. The outer wall 42a that is adjacent to the neck mold 6 is cooled and hardened earlier than the inner wall 42b.

After the injection and filling of the resin, and while the inner wall 42b is still at a deformable temperature, the neck mold 6 as well as the injection core 10 is moved upward by a predetermined distance to remove the spacer 16 from the neck mold 6. By this operation, the spacer 16 defining the outer wall 42a and the inner wall 42b is removed, so that an expansion space 18 appears between the outer wall 42a and the inner wall 42b.

At the same time as the expansion space 18 is formed or after the forming, an air with a proper pressure is blown into the space between the base portion 10a and the inner wall 42b through the air flowing gap 13 between the injection core 10 and the core member 11, so that the inner wall 42b is inflated in the expansion space until the inner wall 42b contacts the outer wall 42a. This expansion affects the tapered space formed by the inner surface of the upper portion of the spacer 16 disposed under the neck mold. The inner wall 42b changes its position to vertical direction along the outer wall 42a, and is pressed to the outer wall 42a to form an integrated neck portion 42.

By this expansion of the diameter, the tapered inner surface rotates to the spacer side around the opening end as an axis. Therefore, a thread 44 formed a little upward by the thread pattern 12 on the tapered surface of the base portion 10a can depart from the thread pattern 12 without deforming the shape of the thread, and the thread 44 changes its position from facing upward to facing horizontal along with the inner wall 42b. While the inner wall 42b expands its diameter, a gap 19 is formed between the inner surface of the neck portion 42 and the outer surface of the base portion 10a of the injection core 10 for removing the core without an interference of both of the threads.

Therefore, after the thread 44 is formed by transferring on the inner surface of the neck portion 42, the thread 44 does not prevent the injection core 10 from being removed at the time of mold releasing, and the injection core 10 can be removed from the preform 40 in the same way as usual operation. Thus, molding of the preform 40 having an inner thread, which was difficult in the prior art, becomes easy.

Not showing in the figures, it is also possible to use a neck mold having an inner thread pattern for forming an outer thread 45 on the outer surface of the outer wall 42a except a convex line on the rim of the opening as shown in the broken line. By integrating with the inner wall 42b, it is easy to form inner and outer threads on the neck portion 42.

Figure 4:
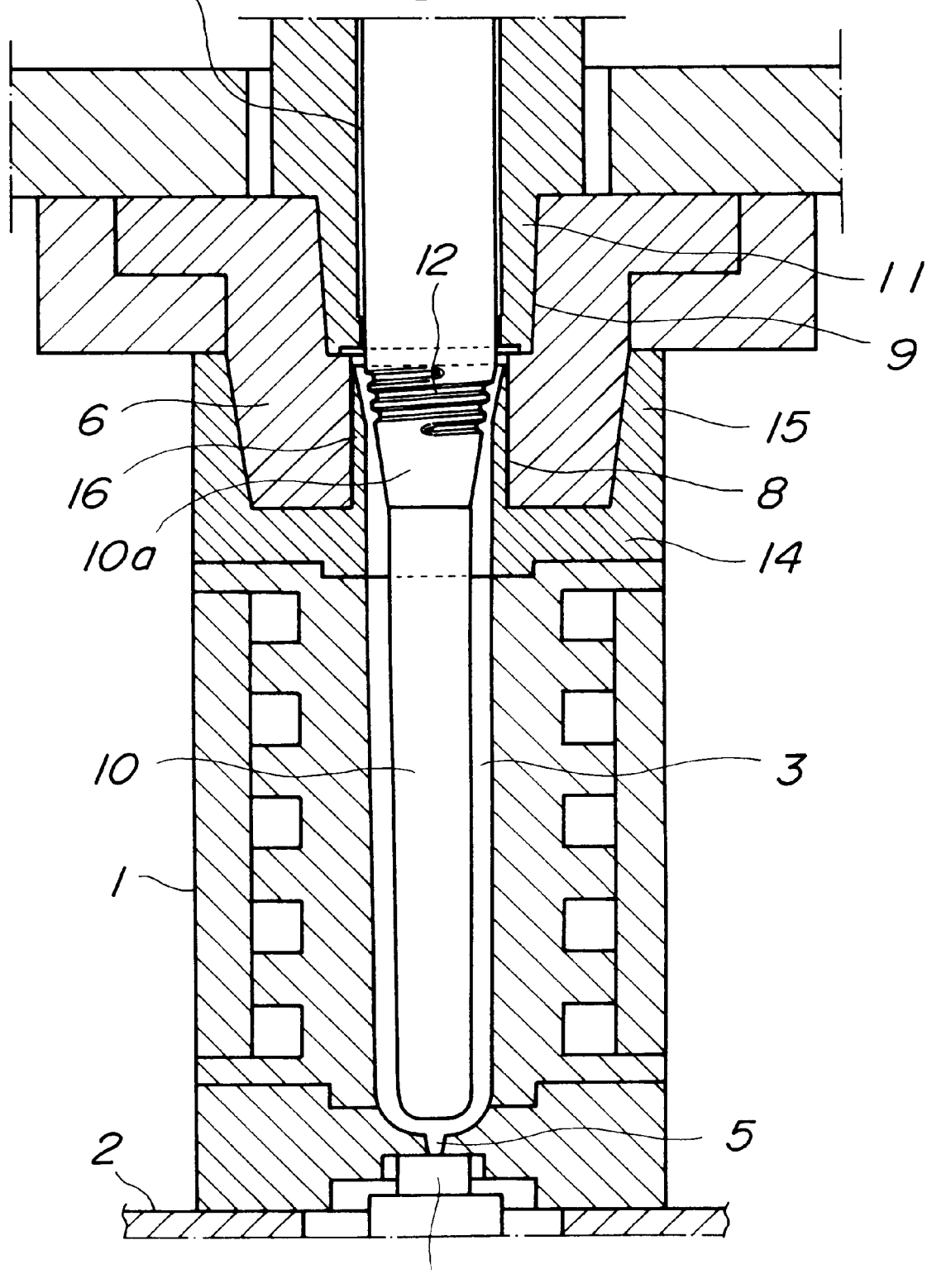
FIG. 4 is a cross section of a mold in the closed state used for a second embodiment of the method according to the present invention.
Figure 5:
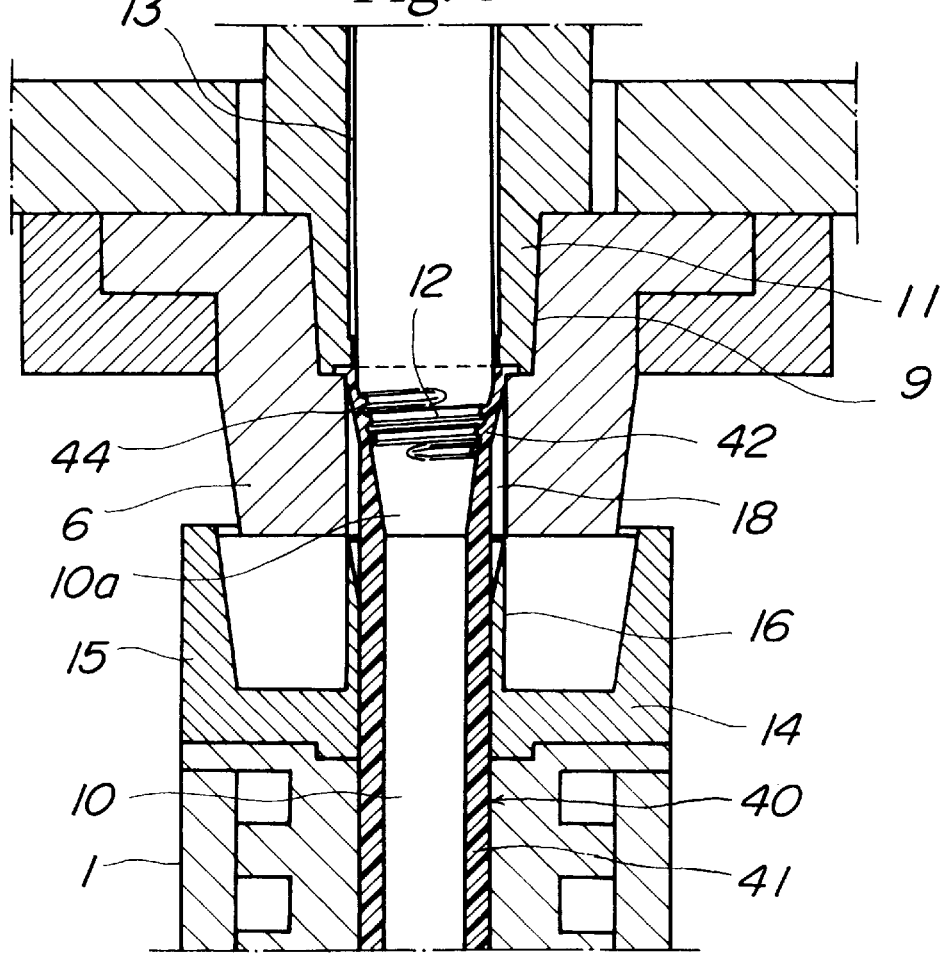
FIG. 5 is cross section of a primary portion showing the inner thread formed at a neck portion.
Figure 6:
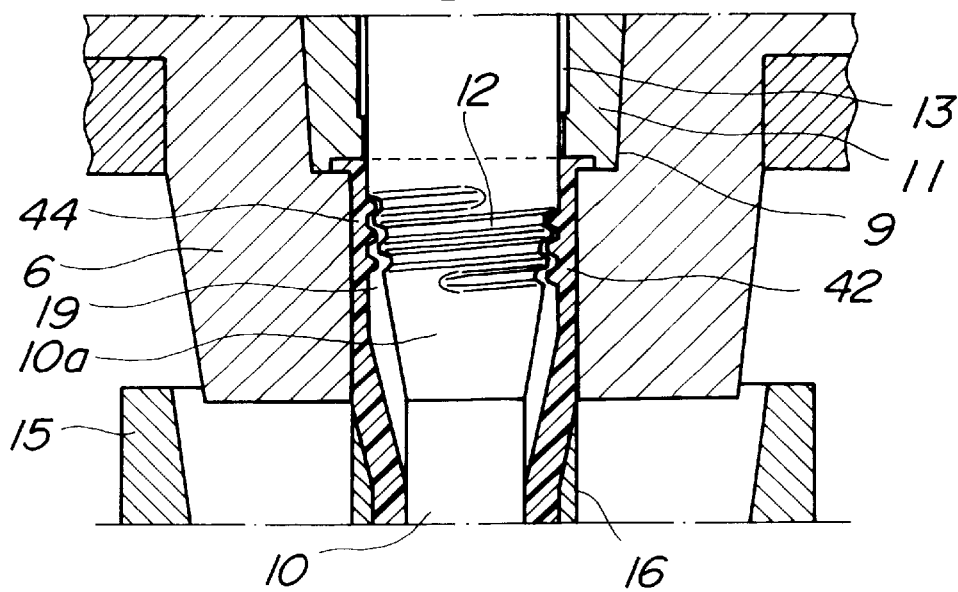
FIG. 6 is a cross section of a primary portion showing a gap for removing the core formed by blowing air.

[Second Embodiment] (FIGS. 4–6)

This embodiment is a method for molding a preform 40 shown in FIG. 9B by forming a gap for removing a core without double wall forming. This molding method is suitable for a preform having a small opening. The difference between this embodiment and the first embodiment mentioned above is a position of the expansion space 18 formed in the neck mold 6. Only the difference will be explained, and an explanation of other portions will be eliminated though their reference numerals are attached.

In this embodiment, the neck cavity 8 and the spacer 16 in the neck mold 6 engages each other so as to form an expansion space 18 between the inner surface of the neck cavity 8 and the neck portion 42, and the mold surface of the neck cavity 8 is made of the inner surface of the spacer 16.

All of a molten resin injected and filled in the injection cavity 3, except for the opening portion in the neck mold 6 is molded into the neck portion 42 tapered in the same way as the inner wall of the above mentioned embodiment by the base portion 10a of the injection core 10 and the inner surface of the spacer 16. After completing the injection and filling, and while the neck portion 42 is still at a deformable temperature, the neck mold 6 as well as the injection core 10 is moved upward by a predetermined distance to remove the spacer 16 from the neck mold 6, so that the expansion space 18 is formed between the inner surface of the neck cavity 8 and the neck portion 42.

In the same way as the above mentioned embodiment, at the same time as the expansion space 18 is formed or after the forming, an air with a proper pressure is blown into the space between the base portion 10a and the neck portion 42, so that the neck portion 42 is inflated until the neck portion 42 contacts the inner surface of the neck cavity 8. By expanding the diameter, the neck portion 42 changes its position to vertical direction along the inner surface of the neck cavity, and a thread 44 formed a little upward by the thread pattern 12 on the tapered surface of the base portion 10a can depart from the thread pattern 12 without deforming the shape of the thread. The gap 19 is formed between the inner surface of the neck portion 42 and the outer surface of the base portion of the injection core 10 for removing the core without an interference of both of the threads. The thread 44 changes its position from facing upward to facing horizontal along with the neck portion 42.

Therefore, in the same way as the first embodiment, after the thread 44 is formed by transferring on the inner surface of the neck portion 42, the thread 44 does not prevent the injection core 10 from being removed at the time of mold releasing, and the injection core 10 can be removed easily from the preform 40 in the same way as usual operation.

Figure 7:
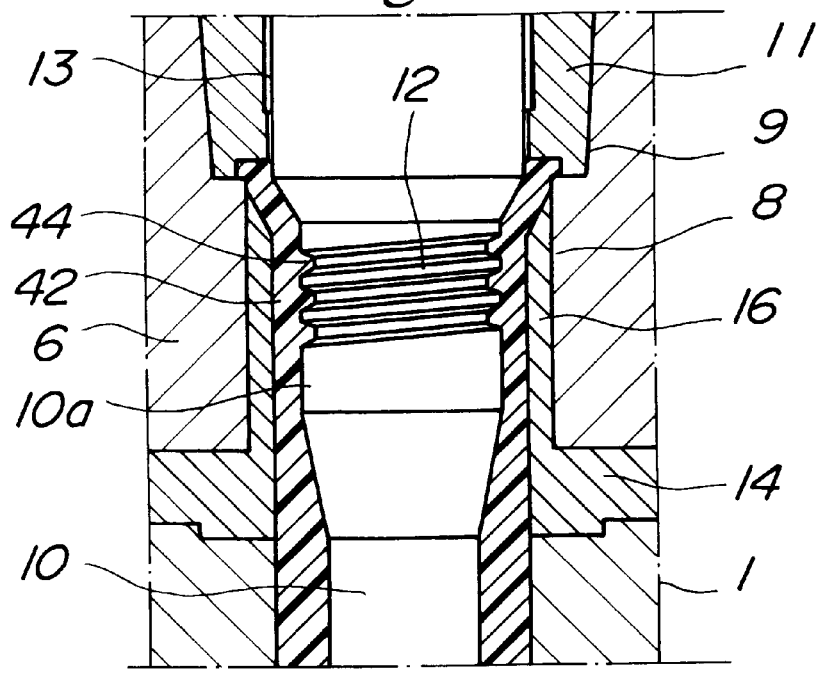
FIG. 7 is a cross section of a primary portion showing the inner thread formed at a neck portion in a third embodiment of the method according to the present invention.
Figure 8:
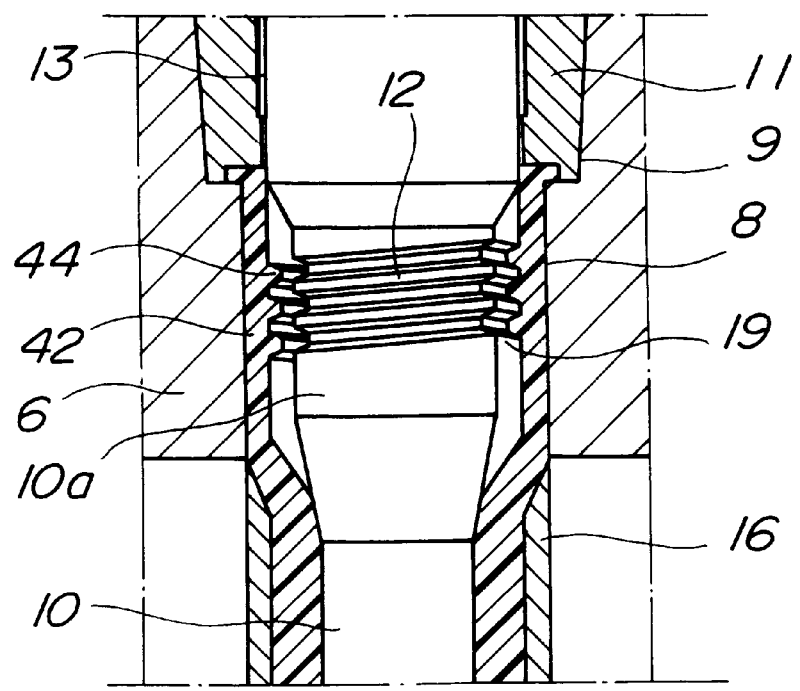
FIG. 8 is a cross section of a primary portion showing a gap for removing the core formed by blowing air.

[Third Embodiment] (FIGS. 7~8)

In this embodiment, the base portion 10a of the injection core 10 having a vertical surface forms the inner surface of the neck portion 42 as a vertical surface, and the thread 44 is formed on the vertical surface by transferring the thread pattern 12 of the base portion 10a.

Also in this case, the formation of the neck portion 42 is performed by using the spacer 16 as a mold surface of the neck cavity 8 except for the opening end. This spacer 16 is a little thicker than at least the depth of the thread 44. Since the spacer 16 is disposed, the wall of the neck portion 42 extends vertically and is shrunk inward from the opening end by the thickness of the spacer. It is preferable that a tapered surface is provided between the opening end and the edge of the thread.

After molding the neck portion 42, the spacer 16 is removed from the neck mold 6 in the same way as the above-mentioned embodiment. Then, the neck portion 42 is inflated by the pressure of the blown air to enter the expansion space that has appeared instead of the spacer 16. Expanding the diameter, the neck portion 42 is remolded such as having the same diameter as opening edge and the thread 44 on the inner surface extending vertically along the inner surface of the neck cavity 8. The gap 19 is formed between the neck portion and the outer surface of the base portion of the injection core 10 for removing the core without an interference of both of the threads. Therefore, after the thread 44 is formed on the vertical inner surface, the injection core 10 can be removed in the same way as the case without thread.

This embodiment can be applied to the inner surface 42b of the first embodiment without modifying.

INDUSTRIAL APPLICABILITY

As mentioned above, since the gap for removing the core is formed by blowing air and enlarging the neck portion or the inner surface in the present invention, the thread formed on the neck portion does not prevent the injection core from being removed at the mold releasing. The injection core can be removed without rotation in the same way as usual. Thus, the mass molding of preforms having inner thread, which has been considered difficult, can be easily performed.

In addition, since the inner thread can be formed by either one of above mentioned methods in accordance with a diameter of the neck portion, the present invention can be applied to a PET bottle used for a drink container, a wide opening container for a food having some viscosity, a double sealed container for chemicals, etc. Thus, the present invention can be applied widely and usefully, and has a high probability for the industrial utility.

What is claimed is:

1. A method for forming a preform having a body portion and a neck portion, said preform neck portion having an inner thread comprising the steps of:

providing an injection mold, a barrel spacer placed onto said injection mold, a neck mold slidably disposed over said barrel spacer, a core member holding an injection core and inserted into said neck mold, said injection core having a base portion and a neck portion, said injection core neck portion having a thread pattern, said injection mold, said barrel spacer, said neck mold and said core member together defining an outer surface of a mold cavity, said injection core defining an inner surface of said mold cavity, said injection core being positioned in said mold cavity so that said injection core base portion is within said injection mold and said injection core neck portion is within said barrel spacer;

injecting resin to fill said mold cavity and thereby form said preform, said thread pattern on said injection core neck portion forming said inner thread of said preform neck portion;

forming an expansion space proximate to said injection core neck portion by separating said neck mold and said core member holding said injection core from said barrel spacer and said injection mold, and expanding said preform neck portion fully in said expansion space by blowing air between said injection core neck portion and said preform neck portion while said preform neck portion is at a temperature for deforming so that a gap for removal of said injection core from said preform is formed between said injection core neck portion and said preform neck portion.

2. The method according to claim 1, wherein a preform double-wall neck portion is formed having an outer wall and an said inner wall having said inner thread and formed in a cavity between said injection core neck portion and said barrel spacer, said outer wall formed in a cavity between said barrel spacer and said neck mold, said neck mold and core member holding said injection core separated from said barrel spacer and said injection mold to form an expansion space, and said inner wall fully expanded in said expansion space by said air blown between said injection core neck portion and said inner wall while said inner wall is at a temperature for deforming so that a gap for removal of said injection core from said preform is formed between said injection core neck portion and said inner wall.

3. The method of claim 1, wherein said injection core neck portion is tapered off toward said injection core base portion and said barrel spacer is tapered to substantially match said tapered injection core neck portion so that said preform neck portion is formed between said tapered injection core neck portion and said tapered barrel spacer and said inner thread is formed by transferring said thread pattern from said tapered injection core neck portion onto said tapered preform neck portion, and said tapered preform neck portion is expanded fully in said expansion space by said blown air so as to extend vertically.

4. The method according to the claim 2, wherein said injection core neck portion is tapered off toward said injection core base portion and said barrel spacer is tapered to substantially match said tapered injection core neck portion so that said inner wall is formed between said tapered injection core neck portion and said tapered barrel spacer and said inner thread is formed by transferring said thread pattern from said tapered injection core neck portion onto said tapered inner wall, and said tapered inner wall is expanded fully in said expansion space by said blown air so as to extend vertically.

* * * * *